US009549503B2

(12) United States Patent
Dupon et al.

(10) Patent No.: US 9,549,503 B2
(45) Date of Patent: Jan. 24, 2017

(54) MOUNT FOR A CABIN OF AN AGRICULTURAL HARVESTER

(71) Applicant: CNH Industrial America LLC, New Holland, PA (US)

(72) Inventors: Luc C. Dupon, Ardooie (BE); Jishan Jin, Naperville, IL (US); Bin Lou, Bolingbrook, IL (US); Jan Pim H. W. Raaben, Sint Andries (BE); Kai Zhao, Willowbrook, IL (US); Djamil Boulahbal, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/410,891

(22) PCT Filed: Jul. 2, 2013

(86) PCT No.: PCT/US2013/049099
§ 371 (c)(1),
(2) Date: Dec. 23, 2014

(87) PCT Pub. No.: WO2014/008276
PCT Pub. Date: Jan. 9, 2014

(65) Prior Publication Data
US 2015/0336623 A1    Nov. 26, 2015

Related U.S. Application Data

(60) Provisional application No. 61/690,692, filed on Jul. 2, 2012, provisional application No. 61/690,693, filed on Jul. 2, 2012.

(51) Int. Cl.
*B62D 65/00* (2006.01)
*A01D 67/02* (2006.01)
(Continued)

(52) U.S. Cl.
CPC ............... *A01D 67/02* (2013.01); *A01D 41/12* (2013.01); *B62D 33/0604* (2013.01); *B62D 65/02* (2013.01); *Y10T 29/49623* (2015.01)

(58) Field of Classification Search
CPC .... A01D 67/02; A01D 41/12; B62D 33/0604; B62D 65/02
(Continued)

(56) References Cited

U.S. PATENT DOCUMENTS 3,731,913 A    5/1973 Hirst
3,847,492 A *  11/1974 Kennicutt ............ B60G 99/004
                                                      296/190.03

(Continued)

FOREIGN PATENT DOCUMENTS

CN    202258737 U    5/2012
DE    1761124 U      2/1958
GB    2032054 A      4/1980

*Primary Examiner* — Joseph D Pape
(74) *Attorney, Agent, or Firm* — Peter K. Zacharias; Patrick M. Sheldrake

(57) ABSTRACT

An agricultural harvesting machine a chassis, a cabin and at least one mount coupling the cabin to the chassis. The mount has a first connecting feature connected to the cabin, a second connecting feature connected to the chassis and a resilient member coupled to both the first connecting feature and the second connecting feature. The resilient member has a shaped void therein.

28 Claims, 3 Drawing Sheets

(51) Int. Cl.
*A01D 41/12* (2006.01)
*B62D 65/02* (2006.01)
*B62D 33/06* (2006.01)

(58) Field of Classification Search
USPC .................................................. 296/190.07
See application file for complete search history.

(56) References Cited

U.S. PATENT DOCUMENTS

| | | |
|---|---|---|
| 3,976,338 A | 8/1976 | Trachte et al. |
| 4,440,437 A | 4/1984 | Hahm et al. |
| 4,727,957 A | 3/1988 | Fujita |
| 4,750,720 A | 6/1988 | Wolf et al. |
| 4,909,489 A | 3/1990 | Doi |
| 4,925,163 A | 5/1990 | Wolf et al. |
| 4,936,539 A | 6/1990 | Nangle |
| 5,014,967 A | 5/1991 | Wolf et al. |
| 5,052,652 A | 10/1991 | Sevilleja et al. |
| 5,108,077 A | 4/1992 | Spaltofski |
| 5,246,214 A | 9/1993 | Wolf et al. |
| 5,487,534 A | 1/1996 | Sakamoto et al. |
| 5,944,297 A | 8/1999 | Flower et al. |
| 5,965,249 A | 10/1999 | Sutton et al. |
| 6,659,438 B2 | 12/2003 | Michael et al. |
| 7,300,100 B2 | 11/2007 | McLean et al. |
| 7,416,244 B2 | 8/2008 | Polk et al. |
| 8,087,718 B2 | 1/2012 | Bengtsson et al. |
| 8,443,923 B2 | 5/2013 | Brosz et al. |
| 8,684,340 B2 | 4/2014 | Smith et al. |
| 2005/0269754 A1 | 12/2005 | Fujii et al. |

\* cited by examiner

MOUNT FOR A CABIN OF AN AGRICULTURAL HARVESTER

This application is the US National Stage filing of International Application Serial No. PCT/US2013/049099 filed on Jul. 2, 2013 which claims priority to U.S. Provisional Application No. 61/690,692, filed Jul. 2, 2012, and U.S. Provisional Application No. 61/690,693, filed Jul. 2, 2012, entitled MOUNT FOR A CABIN OF AN AGRICULTURAL HARVESTER, each of which is hereby incorporated by reference in its entirety.

BACKGROUND OF THE INVENTION

1. Field of the Invention

The present invention relates to agricultural harvesters such as combines, and, more particularly, to a cabin mounting system used in such combines.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The cabin of the combine is connected to the chassis or frame member of the combine with mounts that have a single vibration absorption characteristic. Many of the above mentioned systems cause vibrations in the combine in different frequency ranges. A problem with the prior art mounting system is that it is limited in the ability to efficiently reduce a range of vibrations transmitted to the cabin.

What is needed in the art is a way to efficiently damp vibrations to the cabin of the combine in multiple vibration ranges.

SUMMARY OF THE INVENTION

The present invention provides a cabin mounting system that uses a bi-linear isomount to reduce vibration transmittal to the cabin.

The invention in one form is directed to an agricultural harvesting machine a chassis, a cabin and at least one mount coupling the cabin to the chassis. The mount has a first connecting feature connected to the cabin, a second connecting feature connected to the chassis and a resilient member coupled to both the first connecting feature and the second connecting feature. The resilient member has a shaped void therein.

The invention in another form is directed to a mounting system for coupling a cabin to a chassis of an agricultural harvesting machine. The mount of the mounting system has a first connecting feature connected to the cabin, a second connecting feature connected to the chassis and a resilient member coupled to both the first connecting feature and the second connecting feature. The resilient member has a shaped void therein.

The invention in yet another form is directed to a method of mounting a cabin to a chassis of an agricultural harvesting machine. The method includes the step of coupling the cabin to the chassis with a resilient member having a shaped void therein.

An advantage of the present invention is that it improves the ease of assembly of the cabin to the combine.

Another advantage of the present invention is that the vibration transmittal to the cabin is damped along two substantially linear displacement-force characteristics.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
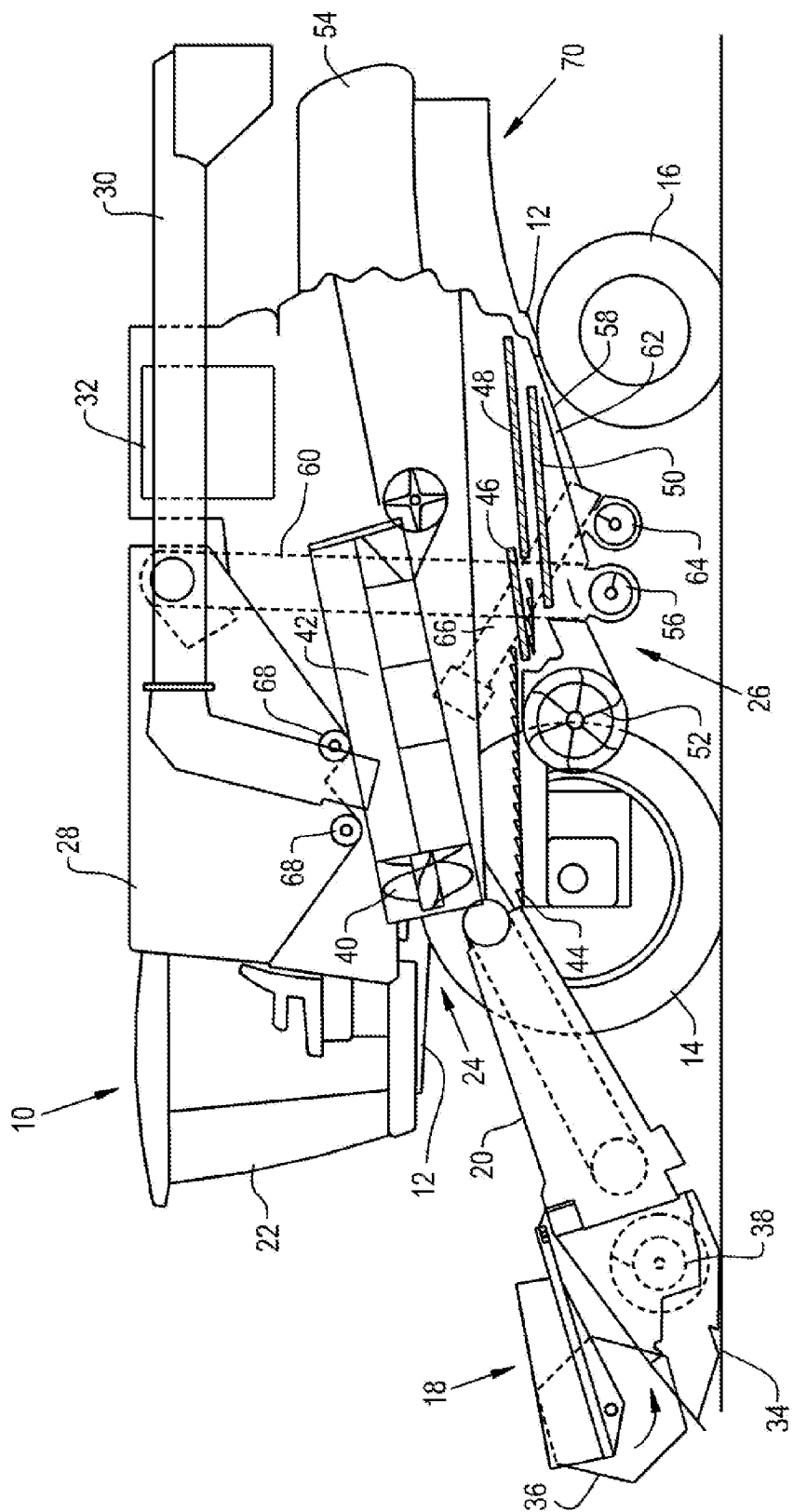
FIG. 1 is a side view of an embodiment of an agricultural harvester in the form of a combine which includes an embodiment of the cabin mounting system of the present invention.

Referring now to the drawings, and more particularly to FIG. 1, there is shown an agricultural harvester which may be any harvesting vehicle, but here, for the sake of convenience, is shown in the form of a combine 10, which generally includes a chassis 12, ground engaging wheels 14 and 16, a header 18, a feeder housing 20, an operator cabin 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10. A residual material handling system 70 distributes the residual material on to the field.

Figure 2:
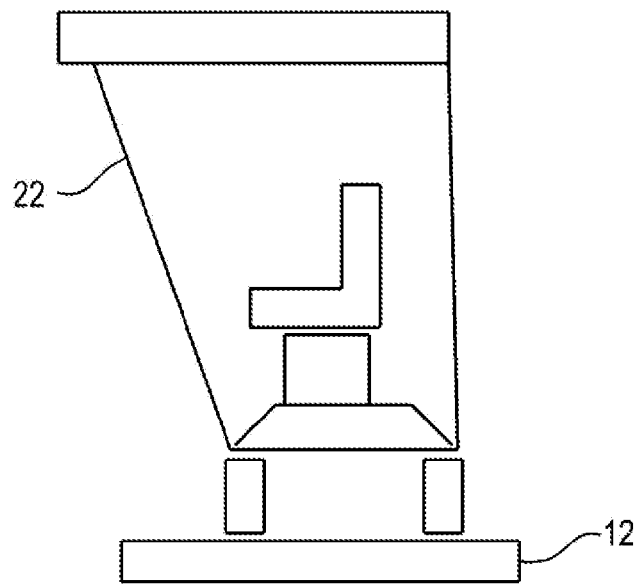
FIG. 2 is a schematical representation of a prior art cabin mounting system.

FIG. 2 illustrates the prior art method of connecting operator cabin 22 to chassis 12 by way of four vertical mounts (two being shown in profile) each being resilient in nature. The assembly of these mounts require the nearly simultaneous alignment of the mounting hardware to cabin 22 as well as to chassis 12.

Figure 3:
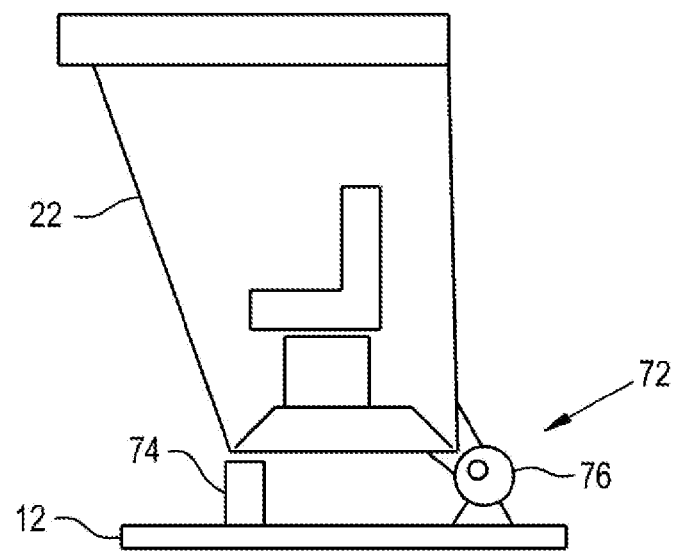
FIG. 3 is a schematical representation of an embodiment of the cabin mounting system of the present invention used in the combine of FIG. 1.

Now additionally referring to FIG. 3, there is illustrated a mounting system 72 that includes vertical mounts 74 and horizontal mounts 76, there being two each, with only one each being shown in profile. Mounts 76 may be referred to as horizontal mounts 76 because the connection of mounts 76 to cabin 22 is by way of a horizontal connection, for example a bolt. This allows cabin 22 to be first connected to mounts 76 allowing a rotation of cabin 22 for the alignment and installation of mounts 74.

Figure 4:
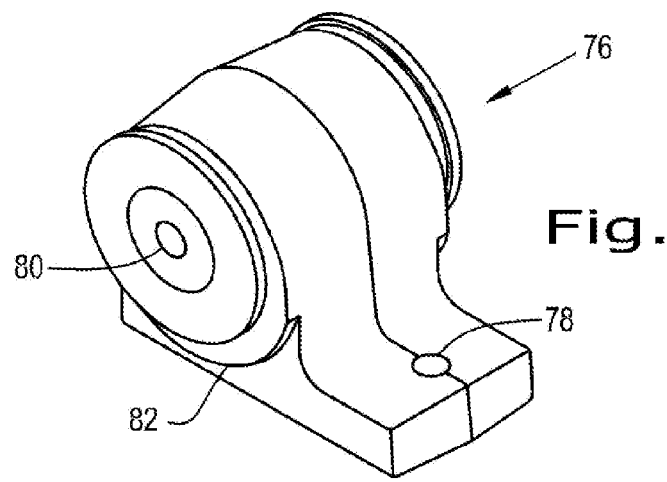
FIG. 4 is a perspective view of a mount used in the mounting system illustrated in FIGS. 1 and 3.

Now additionally referring to FIG. 4, there is shown in a perspective view of one mount 76. Mount 76 includes a connecting feature 78, a connecting feature 80, and a resilient member 82. Connecting feature 80 is illustrated as a hole through which a bolt or other fastener will be inserted to connect a flange or set of flanges extending from cabin 22. Connecting feature 78 is illustrated as a hole through which a bolt can be used to secure mount 76 to chassis 12. Other connection features are also contemplated.

Figure 5:
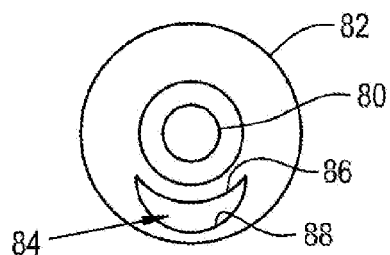
FIG. 5 is a schematical representation of an embodiment of a resilient member in the mount of FIG. 4 used in the mounting system of FIGS. 1, 3 and 4.
Figure 6:
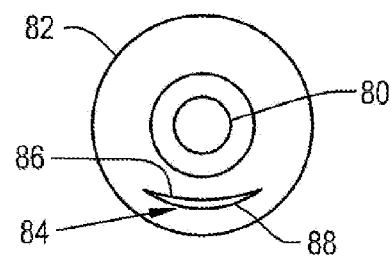
FIG. 6 is a schematical representation of the resilient member of FIG. 5 in a compressed state.

Now additionally referring to FIGS. 5 and 6, there is schematically shown a resilient member 82 having a shaped void 84 therein. Shaped void 84 has a first side 86 and a second side 88. The combination of the resiliency of the material of resilient member 82 and the shape and position of shaped void 84 provides for a distinct bi-linear frequency response isolation mount. To illustrate what happens when a force is applied FIGS. 5 and 6 illustrate, respectively no displacement and a displacement that collapsed shaped void 84. In FIG. 6 sides 86 and 88 are nearly in contact, which corresponds to the "knee" in FIG. 7 which illustrates a transition between linear range 90 and linear range 92. Once sides 86 and 88 come into contact with each other the overall response of mount 76, in terms of the stiffness of mount 76 changes. When a displacement of cabin 22 occurs this translates into a displacement of connecting feature 80 relative to chassis 12. While void 84 is open a large displacement can occur in linear range 92 with a force of resistance that is lower over the initial range of displacement, then as sides 86 and 88 come into contact with each other the force-displacement characteristic changes to that of linear range 90. This allows for better control of the vibration transmitted to cabin 22 and allows for the attenuation of movement that might otherwise be transferred to cabin 22.

The shape of sides 86 and 88 are complementary in that they come together as the resilient material undergoes a displacement. The illustrated shapes for sides 86 and 88 are arcuate each being an arc with a different radius and the two arcs intersecting. It is contemplated that different profiles of sides 86 and 88 may be formed to thereby alter the shape of the force-displacement curve shown in FIG. 7. It is also contemplated that different numbers and location of voids may be utilized to provide tuned performance in different axes of vibration transmittal/absorption.

Figure 7:
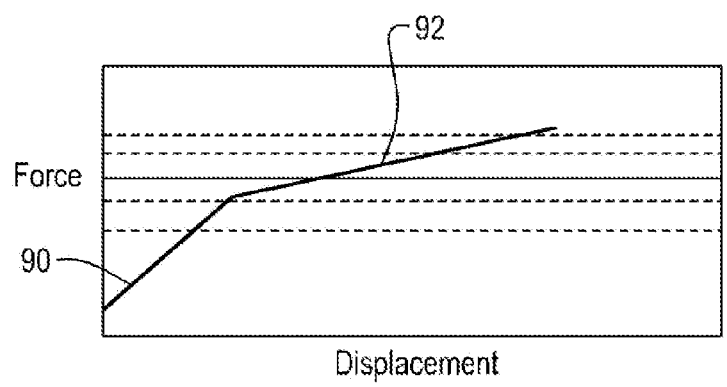
FIG. 7 is an illustration of the stiffness of the mount illustrated in FIGS. 3-6.

The displacement-force characteristic shown in FIG. 7 is translatable to vibration transmittal characteristics of mount 76 over ranges of vibration frequencies.

There are various mechanical vibration excitations transferred to cabin 22 of combine 10. The vibration sources that can transmitted to cabin 22 are those emanating from a cleaning system shaker, a wheat header cutting knife, a threshing rotor, header augers, tire treads, etc. The cabin rubber mount system is normally used to isolate such vibrations to achieve comfortable ride performance. Unfortunately, with the prior art system illustrated in FIG. 2, it is very difficult to achieve good isolation through the conventional rubber mounts. The main challenge is the frequencies of the excitations are distributed in a very wide range from a couple of Hz to very high frequencies. A lower stiffness rubber is required to isolate the lower frequency excitations. For example, in order to isolate the combine cleaning system excitation at 4 Hz, the rubber stiffness needs to be designed so that the cabin natural frequency is much below 4 Hz. Only very low stiffness rubber can achieve the requirement. But, the soft rubber produces a larger movement when a tire hits a bump. This movement is not acceptable, so the mount stiffness has to be designed with a higher stiffness. The present invention resolves this problem by producing resilient mount 76 having into two different stiffnesses.

The stiffness of resilient member 82 in linear range 90 isolates the lower frequencies. The stiffness of resilient member 82 in linear range 92 controls the large cabin movements. This bi-linear stiffness is achieved by placing void 84 inside of the resilient member 82. Under lower displacement, void 84 is open, and as a result mount 76 has a lower stiffness. Under higher displacement, the void is closed and mount 76 displays a higher stiffness. The size of the void is important because it controls the amount of deflection. The larger the void, the higher the cabin movement. The mount stiffness in the lower frequency range is controlled by the rubber stiffness and void 84. The mount stiffness in the high frequency range is controlled by the rubber stiffness alone. The use of the inventive bi-linear rubber mount produce a better ride performance for the operator in cabin 22 without large movements of cabin 22.

The two horizontal mounts 76 in the rearward portion of cabin 22 has the advantages of an easier to tune the cabin pitch mode and ease of cabin 22 installation on combine 10. Mount 76 also reduces the manufacturing cost of combine 10, since rear mount 76 allows cabin 22 to rotate about rear mount 76, the front mount 74 is dominant in the control of the pitch mode of cabin 22 motion. This is an advantage to select only front mount 74 stiffness to avoid pitch vibration due the cleaning system shaker excitation at about 4 Hz. In the prior art mounting system, both front and rear mounts have to be determined to achieve that single goal.

The inventive mounting system 72 allows for easier assembly of cabin 22 on combine 10. For example, on the assembly floor, rear mounts 76 are assembled first. Once rear mounts 76 are assembled, cabin 22 is rotated around the pin of rear mounts 76 to allow easy assembly of front mounts 74. For the conventional system, shown in FIG. 2, the cabin's 4 vertical mounts have to be assembled to the combine at the same time. It is hard to line up all 4 mounts to the mount supports at the same time. Sometimes, cabin 22 needs to be removed from combine 10 for repair purposes. The inventive mounting of cabin 22 makes it a lot easy to remove cabin 22 from and to reassemble cabin 22 back to combine 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvesting machine, comprising:
   a chassis;
   a cabin; and
   at least one mount coupling said cabin to said chassis, said at least one mount including:
   a first connecting feature connected to said cabin;
   a second connecting feature connected to said chassis; and
   a resilient member coupled to both said first connecting feature and said second connecting feature, said resilient member including a shaped void, said shaped void having a first side and a second side, said first side being complementary to said second side, said first side and said second side coming together as the resilient member undergoes a displacement,
   wherein said at least one mount has a first stiffness in a first range of vibration frequencies and a second stiffness in a second range of vibration frequencies depending upon an amount of the displacement.

2. The agricultural harvesting machine of claim 1, wherein said shaped void extends substantially through said resilient member.

3. The agricultural harvesting machine of claim 2, wherein said shaped void extends completely through said resilient member.

4. The agricultural harvesting machine of claim 1, wherein said first stiffness is substantially linear over said first range of vibration frequencies and said second stiffness is substantially linear over said second range of vibration frequencies.

5. The agricultural harvesting machine of claim 1, wherein said first side has an arc shape having a first radius, and said second side has an arc shape having a second radius, said first radius and said second radius being different, said arc shape of said first side and said arc shape of said second side intersecting each other.

6. The agricultural harvesting machine of claim 1, wherein said at least one mount is configured so that said void is positioned in said resilient member such that a downward movement by said cabin causes said void to vary in shape.

7. The agricultural harvesting machine of claim 1, wherein said at least one mount further includes a first mount and a second mount, both said first mount and said second mount being coupled to a rear portion of said cabin, said first mount and said second mount being configured to allow a rotation of said cabin about said first mount and said second mount.

8. The agricultural harvesting machine of claim 7, further comprising at least one front mount coupled between a front portion of said cabin and said chassis, said at least one front mount having a stiffness profile different from said first mount and said second mount.

9. A mounting system for coupling a cabin to a chassis of an agricultural harvesting machine, the mounting system comprising:
at least one mount coupling the cabin to the chassis, said at least one mount including:
a first connecting feature connected to the cabin;
a second connecting feature connected to the chassis; and
a resilient member coupled to both said first connecting feature and said second connecting feature, said resilient member including a shaped void, said shaped void having a first side and a second side, said first side being complementary to said second side, said first side and said second side coming together as the resilient member undergoes a displacement,
wherein said at least one mount has a first stiffness in a first range of vibration frequencies and a second stiffness in a second range of vibration frequencies depending upon a distance of the displacement.

10. The mounting system of claim 9, wherein said shaped void extends substantially through said resilient member.

11. The mounting system of claim 10, wherein said shaped void extends completely through said resilient member.

12. The mounting system of claim 9, wherein said first stiffness is substantially linear over said first range of vibration frequencies and said second stiffness is substantially linear over said second range of vibration frequencies.

13. The mounting system of claim 9, wherein said first side has an arc shape having a first radius, and said second side has an arc shape having a second radius, said first radius and said second radius being different, said arc shape of said first side and said arc shape of said second side intersecting each other.

14. The mounting system of claim 9, wherein said at least one mount is configured so that said void is positioned in said resilient member such that a downward movement by the cabin causes said void to vary in shape.

15. An agricultural harvesting machine, comprising:
a chassis;
a cabin; and
at least one mount coupling said cabin to said chassis, said at least one mount including:
a first connecting feature connected to said cabin;
a second connecting feature connected to said chassis; and
a resilient member coupled to both said first connecting feature and said second connecting feature, said resilient member including a shaped void, said shaped void having a first side and a second side, said first side being complementary to said second side, said first side and said second side coming together as the resilient member undergoes a displacement,
wherein said first side has an arc shape having a first radius, said second side has an arc shape having a second radius, said first radius and said second radius are different, and said arc shape of said first side and said arc shape of said second side intersect each other.

16. The agricultural harvesting machine of claim 15, wherein said shaped void extends substantially through said resilient member.

17. The agricultural harvesting machine of claim 15, wherein said shaped void extends completely through said resilient member.

18. The agricultural harvesting machine of claim 15, wherein said at least one mount has a first stiffness in a first range of vibration frequencies and a second stiffness in a second range of vibration frequencies depending upon an amount of the displacement.

19. The agricultural harvesting machine of claim 18, wherein said first stiffness is substantially linear over said first range of vibration frequencies and said second stiffness is substantially linear over said second range of vibration frequencies.

20. The agricultural harvesting machine of claim 15, wherein said at least one mount is configured so that said void is positioned in said resilient member such that a downward movement by said cabin causes said void to vary in shape.

21. The agricultural harvesting machine of claim 15, wherein said at least one mount further includes a first mount and a second mount, both said first mount and said second mount being coupled to a rear portion of said cabin, said first mount and said second mount being configured to allow a rotation of said cabin about said first mount and said second mount.

22. The agricultural harvesting machine of claim 21, further comprising at least one front mount coupled between a front portion of said cabin and said chassis, said at least one front mount having a stiffness profile different from said first mount and said second mount.

23. A mounting system for coupling a cabin to a chassis of an agricultural harvesting machine, the mounting system comprising:
at least one mount coupling the cabin to the chassis, said at least one mount including:
a first connecting feature connected to the cabin;
a second connecting feature connected to the chassis; and
a resilient member coupled to both said first connecting feature and said second connecting feature, said resilient member including a shaped void, said shaped void having a first side and a second side, said first side being complementary to said second side, said first side and said second side coming together as the resilient member undergoes a displacement, wherein said first side has an arc shape having a first radius, said second side has an arc shape having a second radius, said first radius and said second radius are different, and said arc shape of said first side and said arc shape of said second side intersect each other.

24. The mounting system of claim 23, wherein said shaped void extends substantially through said resilient member.

25. The mounting system of claim 23, wherein said shaped void extends completely through said resilient member.

26. The mounting system of claim 23, wherein said at least one mount has a first stiffness in a first range of vibration frequencies and a second stiffness in a second range of vibration frequencies depending upon a distance of the displacement.

27. The mounting system of claim 26, wherein said first stiffness is substantially linear over said first range of vibration frequencies and said second stiffness is substantially linear over said second range of vibration frequencies.

28. The mounting system of claim 23, wherein said at least one mount is configured so that said void is positioned in said resilient member such that a downward movement by the cabin causes said void to vary in shape.

\* \* \* \* \*